(12) United States Patent
Fowler et al.

(10) Patent No.: US 7,664,578 B2
(45) Date of Patent: Feb. 16, 2010

(54) OPTIMIZING INITIAL INCLINATIONS AND RAANS OF A SATELLITE CONSTELLATION

(75) Inventors: Harmon C. Fowler, Los Angeles, CA (US); Peterson L. Browning, Playa del Rey, CA (US)

(73) Assignee: The Boeing Company, Chicago, IL (US)

( * ) Notice: Subject to any disclaimer, the term of this patent is extended or adjusted under 35 U.S.C. 154(b) by 559 days.

(21) Appl. No.: 11/493,244

(22) Filed: Jul. 26, 2006

(65) Prior Publication Data

US 2008/0027595 A1    Jan. 31, 2008

(51) Int. Cl.
*G06F 17/00* (2006.01)

(52) U.S. Cl. .......................................... 701/13; 701/226
(58) Field of Classification Search .................... 701/13, 701/226, 200, 3–5; 342/357.06
See application file for complete search history.

(56) References Cited

U.S. PATENT DOCUMENTS

| | | | |
|---|---|---|---|
| 5,845,206 A * | 12/1998 | Castiel et al. | 455/13.4 |
| 5,867,783 A | 2/1999 | Horstein et al. | |
| 5,931,417 A | 8/1999 | Castiel | |
| 5,957,409 A * | 9/1999 | Castiel et al. | 244/158.4 |
| 6,102,335 A * | 8/2000 | Castiel et al. | 244/158.4 |
| 6,122,596 A | 9/2000 | Castiel | |
| 6,128,575 A | 10/2000 | Croom et al. | |
| 6,198,907 B1 * | 3/2001 | Torkington et al. | 455/12.1 |
| 6,198,990 B1 | 3/2001 | Croom et al. | |
| 6,597,989 B2 | 7/2003 | Castiel | |
| 6,701,126 B1 * | 3/2004 | Draim | 455/13.1 |
| 6,714,521 B2 | 3/2004 | Draim | |
| 6,954,613 B1 | 10/2005 | Castiel et al. | |
| 7,370,566 B2 * | 5/2008 | Furman | 89/1.11 |

OTHER PUBLICATIONS

PCT Search Report, Jul. 16, 2008, Boeing Company, PCT/US2007/010841.
Kechichian, "Orbit Plane Control Strategies for Inclined Geosynchronous Satellite Constellation", Journal of Spacecraft and Rockets, vol. 35, No. 1, Jan 1998 (pp. 9).

* cited by examiner

*Primary Examiner*—Yonel Beaulieu
(74) *Attorney, Agent, or Firm*—Haynes & Boone, LLP.

(57) ABSTRACT

A method for minimizing the amount of propellant required to be carried onboard the satellites of an Earth orbiting satellite constellation to maintain the minimum angle of elevation between a selected geographical area of the Earth and at least one satellite of the constellation during the life of the constellation includes establishing an optimal initial inclination and RAAN of each satellite of the constellation. The method enables the satellites of the constellation to carry additional hardware and other payload mass, or alternatively, the design life of the constellation to be increased.

5 Claims, 5 Drawing Sheets

OPTIMIZING INITIAL INCLINATIONS AND RAANS OF A SATELLITE CONSTELLATION

BACKGROUND

This invention pertains to orbital mechanics, in general, and in particular, to a method of optimizing the initial inclination and right ascension of the ascending node (RANN) of each of the satellites of a constellation of communication satellites to minimize the amount of onboard propellant required to be carried by the satellites for constellation orbit management while maintaining a selected minimum allowable level of earth coverage during the life of the constellation.

The objective of any constellation of satellites is to provide "good coverage," defined as continuously maintaining a minimum line-of-sight angle of elevation from selected positions on the surface of the Earth (e.g., ground stations) to at least one of the satellites of the constellation throughout the design life of the constellation. This implies that the constellation is inclined and equally spaced around the Earth such that the right ascension of the ascending node (RAAN) separation between any two satellites of the constellation remains comparable. The satellites share the responsibility for maintaining good coverage by keeping the elevation angle above the minimum allowable at all times during the mission life of the constellation.

In order to share the responsibility for maintaining a sufficient elevation angle, the satellites must be adequately spaced around the Earth via their respective RAANs. The inclined orbit is subject to a variety of perturbative accelerations (e.g. solar and lunar gravity) which induce variations in the orbital parameters, particularly in the inclination itself. The rate of change in RAAN (i.e., nodal regression) of a given satellite is a function of the orbital inclination. Therefore, variations in the inclination will induce variations in nodal regression which, in turn, affect the RAAN separation between any two satellites of a constellation. If the RAAN separation between any two satellites in the constellation varies by a substantial amount, the coverage falls dramatically. The coverage is also extremely sensitive to certain changes in orbital inclination.

Numerous examples of satellite constellations that are adapted to effect good coverage with respect to selected areas of the Earth's surface may be found in the patent literature in, e.g., U.S. Pat. No. 6,714,521 to J. Draim; and, U.S. Pat. Nos. 6,954,613; 6,597,989; 6,122,596; and, 5,931,417, all to D. Castiel. Examples of methods for accurately inserting satellite constellations into common orbital planes are described in, e.g., U.S. Pat. Nos. 6,198,990 and 6,128,575 to C. Croom et al.

Conventionally, the inclination of the respective orbits of the satellites are tightly controlled about some constant mean or target value—often the critical inclination of 63.4° which minimizes the precession of the orbital line of apsides. Small variations in the satellite inclination due to orbital perturbations are controlled with thruster burn maneuvers in order to stay within some small tolerance of the inclination target. With all the satellites in a constellation at effectively the same inclination, there is no need to directly control the satellite RAANs to maintain equitable RAAN separation of the constellation. RAAN separation control is instead effected by making small adjustments to the inclination and thereby achieving the desired nodal regression to maintain equitable RAAN separation. Good coverage is insured by holding the satellite inclinations and the relative RAAN separations effectively constant over the constellation life.

The disadvantage of the prior art solution is that a substantial amount of propellant is used to perform inclination control and thereby maintain good coverage. The large amount of propellant necessary to maintain the constellation limits the mass of the hardware and payload that the satellites can carry, or alternatively, the mission life of the constellation. Thus, if the amount of propellant required to be carried by the satellites can be reduced, the satellites can then carry additional hardware and other payload mass, or alternatively, the design life of the constellation can be increased.

BRIEF SUMMARY

In accordance with the exemplary embodiments thereof described herein, the present invention provides methods for establishing the optimal initial inclination and RAAN of each of the satellites of a satellite constellation so as to substantially reduce or obviate any out-of-plane maneuvers required of the satellites to maintain good constellation coverage during the life of the constellation. By simply choosing the correct combination of initial inclination and RAAN for each satellite, the constellation not only accomplishes the specified mission objectives, but does so using substantially less propellant. The two Keplerian elements, or orbital parameters, of initial inclination and RAAN, are selected for each satellite such that, over the life of the constellation, the nodal separation between any two satellites remains within a selected range, and coverage to the selected Earth stations remains equal to or greater than a specified minimum angle of elevation. With this initialization, the satellites are thereafter free to drift in both inclination and RAAN throughout their lifetime, and the necessity of maneuvers to control these orbital parameters to maintain good coverage is eliminated or substantially reduced. The invention thus enables a substantial reduction in the amount of propellant that the satellites must carry onboard to maintain good coverage during the life of the constellation.

In one exemplary embodiment, the method of the invention comprises establishing an initial inclination and RAAN of each satellite to maintain good ground coverage over the operational life of the constellation. There are no fixed target values for the inclination and RAAN separation over the operational life, however as a result of maintaining good ground coverage, the maximum RAAN separation between any two adjacent satellites with respect to the nominal or conventional RAAN separation remains bounded and is, in effect, minimized. Establishment of the initial inclination and RAAN of each satellite comprises:

providing an initial value of the initial inclination and RAAN of each of the satellites of the constellation that is adapted to effect maintenance of the required coverage;

computing the resultant minimum elevation angle to the selected Earth stations over the life of the constellation using the initial values;

varying the initial values of the inclination and RAAN of a first one of the satellites by respective selected amounts in order to drive the minimum elevation angle to the selected Earth stations above the required value which defines good coverage;

re-computing the minimum Earth station elevations for each satellite in the constellation over the life of the constellation using the varied initial inclination and RAAN values of the first satellite and the initial values of the initial inclination and RAAN of the other satellites;

reiterating the preceding steps until the minimum elevation angle to the selected Earth ground stations either meets the good coverage requirement or cannot be further improved; and, repeating the preceding steps for each of the other satellites of the constellation.

In a preferred exemplary embodiment of the method, the computational effort involved in computing the optimized initial inclinations and RAANs of the satellites by the above method is substantially reduced by the provision of initial values of the initial inclinations and RAANs of the satellites that are sufficiently close to the optimal solution as to produce a rapid convergence on the optimal values. An exemplary embodiment of an algorithm adapted to compute such a sufficiently close set of initial elements comprises assuming a nominal RAAN separation between each adjacent pair of the satellites and then dividing the constellation into groups of three adjacent satellites. Then, for each group of three adjacent satellites:

calculating the maximum and minimum excursions from the nominal RAAN separation of each adjacent pair of satellites during the life of the constellation;

adding the maximum and minimum excursions of each adjacent pair arithmetically;

taking the absolute value of the sum of each addition;

arranging the absolute values into a maximum, a middle and a minimum absolute sum;

selecting the satellite that is common to the maximum and the middle absolute sums;

adding half of the maximum absolute sum to the initial RAAN of the selected satellite arithmetically such that the maximum absolute sum of the group is decreased;

reiterating the preceding steps until the minimum and maximum excursions of the adjacent pairs of satellites of the group are equal to each other within a selected tolerance range; and, repeating the foregoing procedure for each group of three adjacent satellites of the constellation until the maximum RAAN separation for the entire constellation has been reduced to a value within a selected minimum range.

A unique feature of the invention is that it enables the constellation to be maintained without any, or with only a minimum amount of out-of-plane adjustment of the orbital inclination and RAAN of the satellites. By initializing the initial inclination and RAAN of each satellite of the constellation in accordance with the invention, only small touch-up maneuvers are required, thereby substantially reducing the amount of propellant consumed over the lifetime of the satellite. Thus, while some small, touch-up satellite maneuvers may be required due to unaccounted-for orbital perturbations, variations in momentum-control thruster firings, and other inplane station-keeping thruster performance errors, the reduced mass of propellant required directly results in additional hardware and payload mass being made available, or alternatively, in increased mission life of the constellation.

A better understanding of the above and many other features and advantages of the methods of the present invention may be obtained from a consideration of the following detailed description of some exemplary embodiments thereof, particularly if such consideration is made in conjunction with the appended drawings, wherein like reference numerals are used to identify like elements illustrated in one or more of the figures thereof.

DETAILED DESCRIPTION

Figure 1:
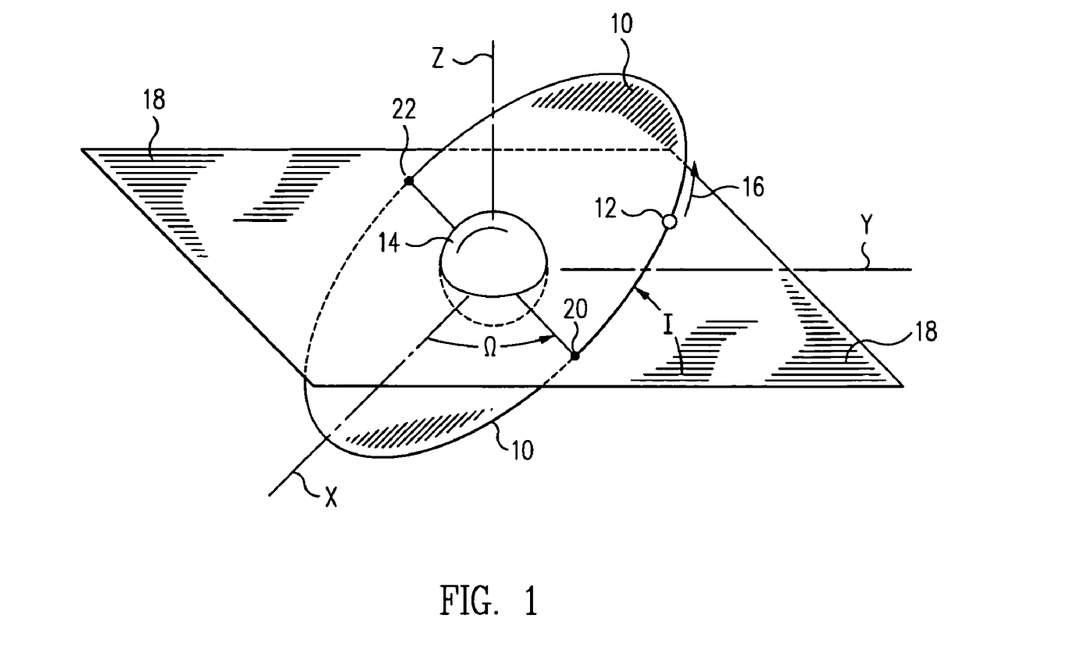
FIG. 1 is a diagrammatic perspective view of an orbital plane of a satellite orbiting the Earth in an exemplary elliptical orbit having an inclination with respect to the equator.

FIG. 1 is diagrammatic perspective view of the orbital plane 10 of a satellite 12 orbiting the Earth 14 in the direction of the arrow 16 in a circular or an elliptical orbit having an inclination I with respect to an equatorial plane 18. The orbit of the satellite can be described or specified precisely by a group of so-called "Keplerian elements" or orbital parameters, relative to a mutually orthogonal, equatorial coordinate system of axes extending through the center of the Earth, consisting of a Z axis that is coaxial with the equatorial pole of the Earth, an X axis that is oriented through the Vernal Equinox, i.e., the point on the equator at which the sun appears to rise on the first day of Spring each year, and a Y axis that is orthogonal to both the X and Z axes.

Two of the orbital elements that are of particular interest to the present invention are the inclination, I, of the orbit, i.e., the angle between the orbital plane 10 and the equatorial plane 18, and the Right Ascension of the Ascending Node (RAAN), $\Omega$. As may be seen in FIG. 1, as the satellite 12 traverses the orbit in the direction of the arrow 16, it passes through the equatorial plane 18 twice, viz., at the point 20, referred to as the "ascending node," at which it passes from the southern hemisphere into the northern hemisphere, and at the point 22, referred to as the "descending node," at which it passes from the northern hemisphere into the southern hemisphere. The RAAN is the angle $\Omega$ between the X axis and an axis extending from the center of the Earth and through the ascending node 20.

As those of skill in the art will appreciate, the elements of a given orbit are not fixed in time, but vary continuously in accordance with a number of perturbing influences acting on the satellite 12 while in orbit, including the gravitational influences of the sun, the moon, and the Earth, the relative positions of which are continuously changing, and the latter being rendered more complex by the fact that the Earth is not perfectly spherical, but rather, relatively flattened at its poles. Other perturbing influences acting on the satellite include atmospheric drag. However, given an accurate set of initial conditions, it is possible to predict with good accuracy the amount of variation that the elements of the satellite orbit, including its inclination and RAAN, will experience within any time frame, or "epoch," using known orbital computational tools.

In accordance with exemplary methods of the invention, good Earth coverage is maintained over the design lifetime of a constellation of telecommunication satellites with nominally no out-of-plane, or inclination/RAAN control, maneuvers of the satellites being required during that lifetime. There are two objectives to the optimum RAAN/Inclination ($\Omega$/I) initialization method of the present invention: 1) Initializing both the respective inclinations and RAANs of the satellites such that the varying inclinations of the satellites remain within a range that provides adequate coverage for the design lifetime of the constellation; and, 2) Initializing both the inclinations and RAANs such that the varying RAAN separations between the satellites remains within a range that provides adequate coverage over the entire constellation design life.

The method enables finding the optimal initial inclination and RAAN for each satellite such that, over the lifetime of the constellation, the out-of-plane satellite maneuvers required for constellation maintenance are eliminated or substantially minimized while Earth coverage remains adequate. After these two orbital elements are initially established at launch, the respective inclinations and RAANs of the satellites are thereafter allowed to drift in accordance with the various orbital perturbations to which they are exposed during the lifetime of the constellation.

Figure 2A:
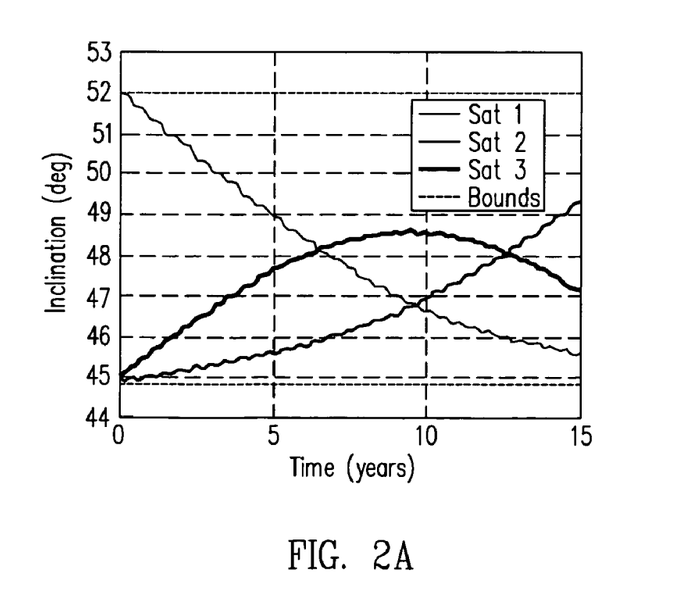
FIGS. 2A and 2B are graphs respectively illustrating the predicted variations in inclination and RAAN of an exemplary three-satellite constellation over an assumed 15-year constellation lifetime.
Figure 2B:
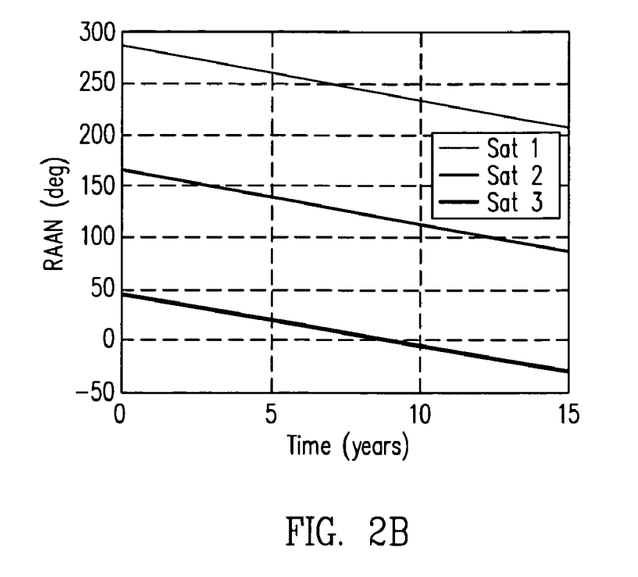
Figure 3:
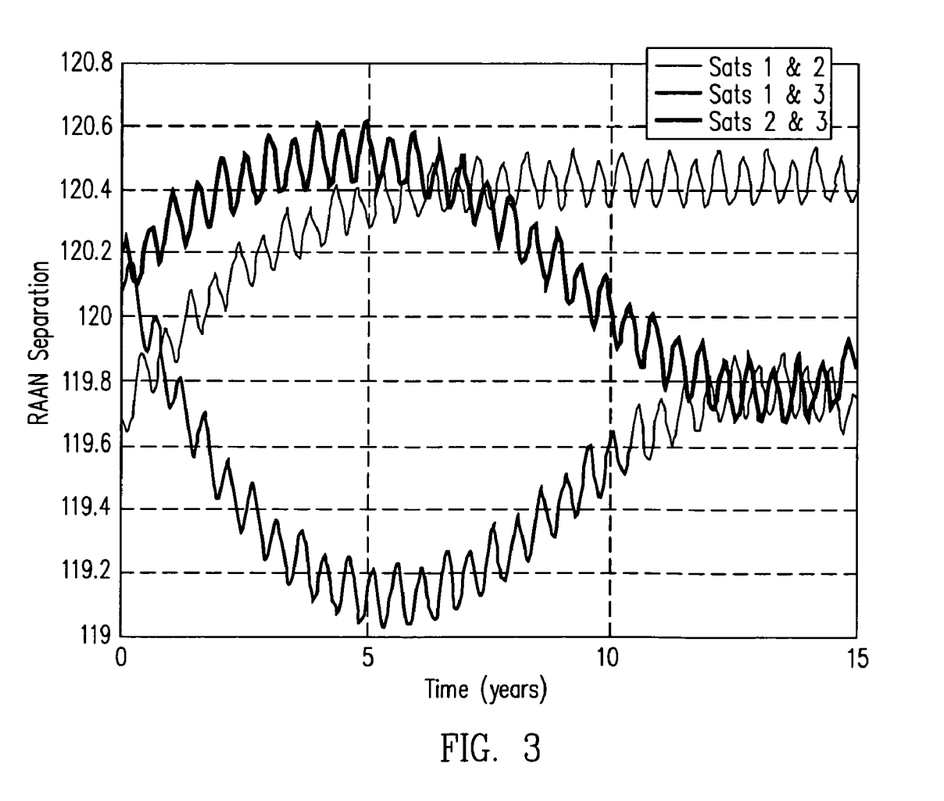
FIG. 3 is a graph illustrating the RAAN separation between any two satellites of the constellation of FIGS. 2A and 2B over its 15-year life.
Figure 4A:
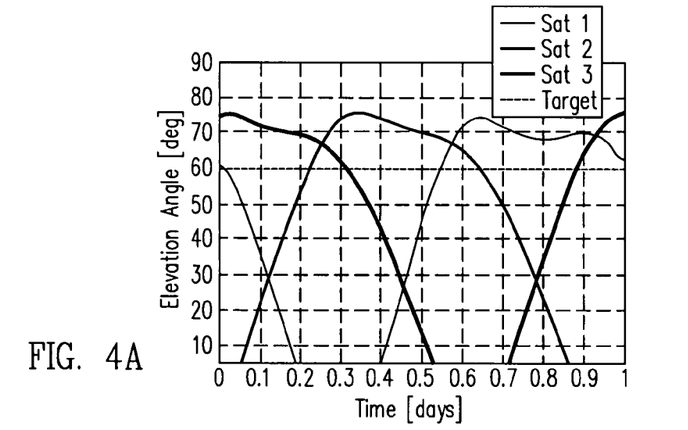
FIGS. 4A-4C are graphs respectively illustrating the coverage provided by the satellite constellation of FIGS. 2A, 2B and 3 to the city of New York, N.Y., for the first, middle, and last days of the constellation's 15-year lifespan.
Figure 4B:
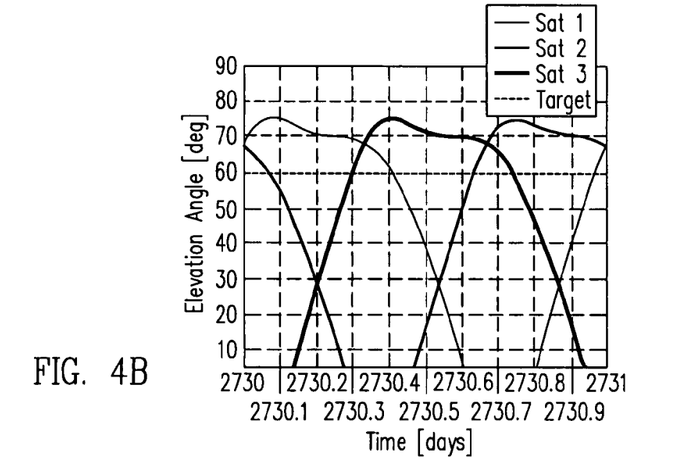
Figure 4C:
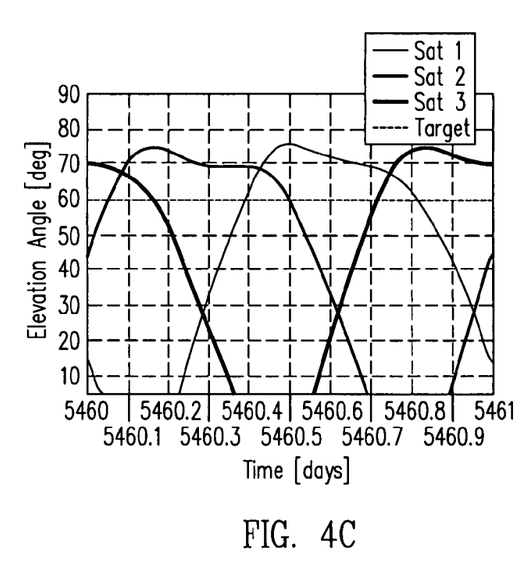

FIGS. 2A and 2B are graphs respectively illustrating the predicted drifts in inclination and RAAN of an exemplary three-satellite constellation over an assumed 15-year constellation lifetime while providing good elevation angle coverage for ground targets in the continental United States. FIG. 3 is a graph illustrating the RAAN separation between any two satellites of the constellation over its 15-year life. As illustrated in FIG. 3, by correctly initializing the respective initial inclinations and RAANs of each of the satellites, the RAAN separation remains within ±1° of the target value, i.e., ~120°, for the life of the constellation. While it is difficult to illustrate the coverage provided to a range of United States cities over the 15-year life of the constellation, FIGS. 4A-4C are graphs respectively illustrating the coverage provided by the constellation of FIGS. 2A, 2B and 3 to the city of New York, N.Y., for the first, middle, and last days of the constellation's 15-year lifespan. It should be noted in FIG. 3 that, even with the varying inclinations and RAANs of FIGS. 2A and 2B, the coverage (i.e., the minimum elevation angle from the selected geographical area) nevertheless remains above the specified minimum elevation angle target of 60° throughout the life of the constellation.

As discussed above, conventional satellite constellation maintenance is typically realized via a local optimization of orbital elements to achieve relatively narrow inclination and right ascension of ascending node (RAAN) separation targets on a cycle-by-cycle basis. That is, each maneuver cycle is optimized to minimize the propellant usage by the satellites such that deviations of the orbital inclination I and RAAN $\Omega$ separation are minimized with respect to unvarying target values. The overall performance of the constellation vis-à-vis ground coverage (i.e., maintenance of minimum line-of-sight elevation angles) is therefore dictated by the choice of the fixed inclination and RAAN separation targets. Thus, the required propellant usage for constellation maintenance is also a function of the inclination and RAAN separation targets. Therefore, the overall optimization of the constellation over the mission life of the constellation involves the choice of the fixed orbital targets as a function of ground coverage requirements and localized maneuver propellant usage associated with those targets. A "signature" of this conventional constellation maintenance concept is the regularity of the orbital element variations from the prescribed target values thereof, and the relatively small size of those variations—which result in well-defined mean values for the inclination and RAAN separation.

The method of the present invention departs from conventional satellite constellation design in that the ground coverage is optimized to meet the customer requirements, while at the same time minimizing the overall propellant usage as a function of only the initial values of the inclination and RAAN separation for each satellite. Another difference is that the present invention yields irregular variations in the inclination and RAAN separation over the life of the constellation, and therefore, will not necessarily exhibit any obvious mean values thereof. During the mission life of the constellation, the inclination and RAAN separation are not controlled with respect to some fixed target, but instead, are adjusted (if necessary) to achieve the minimum ground coverage requirement target with an overall minimum propellant usage. The advantage of the present method compared to that of the conventional constellation design method described above is a substantial reduction in the propellant usage required for constellation orbital maintenance.

The optimization of the initial inclination and RAAN separation for each satellite in the constellation can be performed by many off-the-shelf Non-Linear Programming (NLP) tools, such as "AIMMS," available from Paragon Decision Technology, BV, "AMPL," developed by Bell Laboratories, and "GAMS," developed and marketed by the GAMS Development Corp. The NLP problem is simply the optimization of an objective over a selected group of parameters and with respect to linear and nonlinear equality and inequality constraints. In this case, the objective to be minimized is the overall propellant usage for control of the inclination and RAAN separation over the life of the constellation. The parameters which achieve this minimization are the respective initial satellite inclinations and RAANs (or alternatively, the initial RAAN separations) at the Beginning of Life (BoL) epoch. The constraints to be satisfied by the optimal solution are the customer ground coverage requirements, which typically take the form of a minimum elevation line-of-sight angle to one or more satellites in the constellation for some range of ground latitudes and longitudes.

The essential difference between the prior art methods and the method of the present invention relates to the definition of the NLP problem. In the prior art method, the objective is still to minimize the overall propellant usage for control of the inclination and RAAN separation over constellation life, and the constraints are still the customer specified minimum ground coverage requirements, but the only parameter of consideration is the fixed mean inclination target to be maintained over the constellation life, whereas, in the present invention, the initial or BoL inclinations per satellite and the associated RAANs, are the parameters of concern.

There are a variety of methods by which an NLP problem can be solved. Most off-the-shelf tools use some form of a "gradient search" method in which the parameter(s) to be optimized are altered iteratively from some initial guess by taking a "path of steepest descent." That is, the gradient or derivative of the parameters with respect to the objective is used to minimize the value of the objective, while also satisfying the imposed constraints. The details of the optimization process vary from tool to tool, but all such methods are highly dependent upon the quality of the initial guess. Successful convergence of a given algorithm is usually dependent upon obtaining an initial guess of the parameters which is sufficiently close to the optimal solution.

In accordance with the present invention, the first problem to be solved, then, is the determination of a good initial guess. In fact, if the initial guess is good enough, the problem is essentially solved from a practical standpoint, and there may be no need for the actual optimization process to be performed. An accepted method for finding an initial guess is to "discretize" the parameters to be optimized and then to exhaustively evaluate each permutation of the resulting parameter "tradespace." The choice for the discrete initial inclinations to be evaluated is therefore left to good engineering judgment. However, as those of skill in the art will appreciate, the customer requirements for selected coverage elevation angles to selected geographical areas of the Earth will often suggest reasonable inclination ranges to start with.

Because the problem at hand involves two parameters per satellite (BoL inclination and RAAN), an exhaustive search for a good initial guess is generally prohibitive. For example, it will be appreciated that if each parameter of, e.g., a three satellite constellation were to be discretized into 20 potential values, this would result in more than 64 million cases that need to be evaluated. Following is a description of an exemplary preferred method for reducing the number of cases to be evaluated by algorithmically selecting the RAAN separation for a given inclination permutation.

The process for generating a reasonable initial guess for the NLP optimization problem starts with the determination of the initial discrete inclinations for each satellite, which are chosen based upon the expected coverage elevation angles. Then, for each inclination combination, the minimization of the maximum RAAN separation is performed (see below) and the resulting coverage performance over constellation life is evaluated (either by simulation or analytically). The initial guess is then simply the combination of the initial inclinations and associated RAANs that provide the best coverage performance over the life of the constellation. This best initial guess can then be used as an input to any standard NLP solver. As discussed above, the initial guess itself is often good enough to be used directly without the need for any final NLP optimization.

Reducing the Tradespace of the Initial Guess

Given a nominal RAAN separation adapted to maintain good ground coverage, a reasonable approximation for the optimal respective satellite RAAN separations is obtained by adjusting the initial satellite RAANs so as to minimize the deviation of the RAAN separations from their nominal values. For example, a four satellite constellation might have nominal RAAN separations of 90° to achieve adequate ground coverage. Instead of discretizing the initial RAANs for each satellite into, e.g., 20 cases per satellite and then evaluating each permutation over constellation life for good ground coverage performance, a method for adjusting the initial RAANs in an iterative process is provided below such that the maximum deviation from the nominal RAAN separation is minimized. In the above example, the goal is to iteratively minimize the maximum RAAN separation with respect to the exemplary nominal RAAN separation of 90°.

For all practical purposes, the "nodal regression," or slope of the time-varying RAAN over the satellite life does not depend on the value of the RAAN itself. Therefore, adjusting the initial RAAN for a given satellite of the constellation will alter the RAAN separation with respect to its neighbors on a one-to-one basis.

Figure 5:
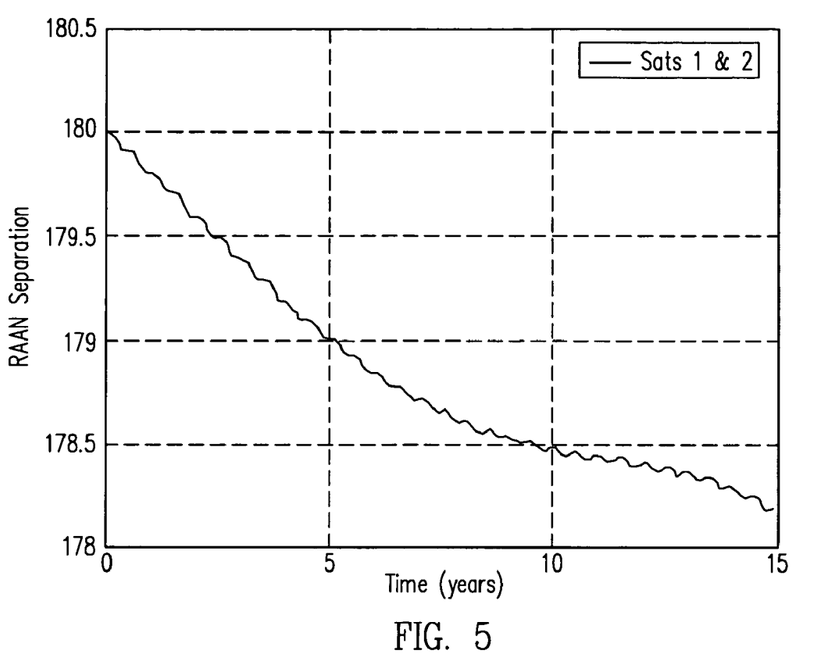
FIG. 5 is a graph illustrating the RAAN separation of an exemplary two-satellite constellation over an assumed 15-year constellation life.

The simplest constellation consists of two satellites equally spaced around the Earth (i.e., a RAAN separation of 180°). FIG. 5 is a graph illustrating the RAAN separation of an exemplary two-satellite constellation over an assumed 15-year constellation life. It should be noted in FIG. 5 that the RAAN separation begins at the nominal separation of 180°, but deviates from this nominal value as time passes. By adjusting the initial RAAN of either of the two satellites, the maximum deviation from the nominal separation can be minimized.

Figure 6:
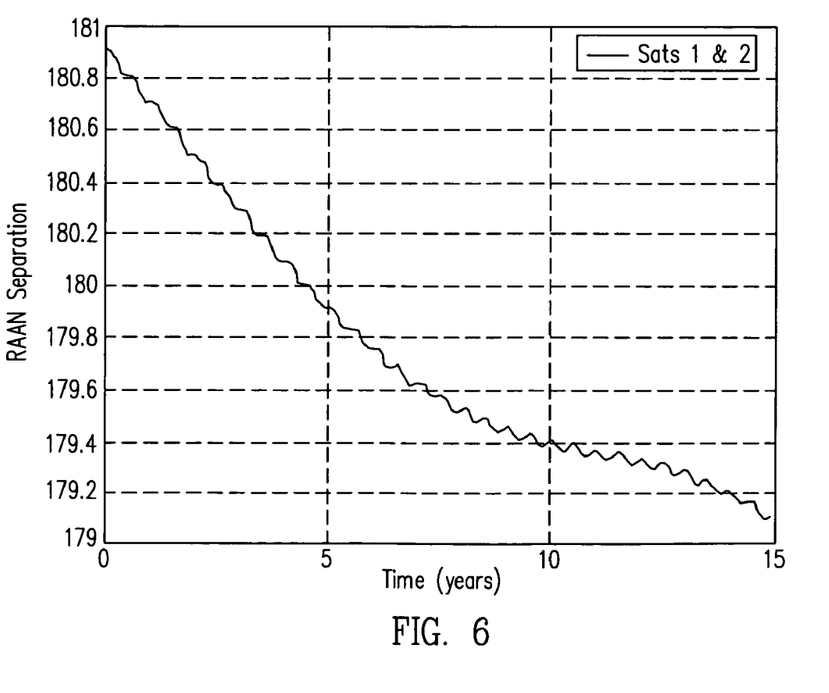
FIG. 6 illustrates the RAAN separation of the two-satellite constellation of FIG. 5, but with the initial RAAN of one of the two satellites optimized in accordance with the methods of the present invention.

FIG. 6 illustrates the RAAN separation of the same two-satellite constellation illustrated in FIG. 5, but with the initial RAAN of one of the two satellites adjusted by approximately +0.9°. It may be noted in FIG. 6 that the maximum deviations from the nominal separation have been minimized. For this simple case, it may be seen that either of the two satellite's initial RAAN must be adjusted by half of the maximum deviation as illustrated in FIG. 5 (~1.8°), such that the initial RAAN separation is approximately 180.9°.

Figure 7:
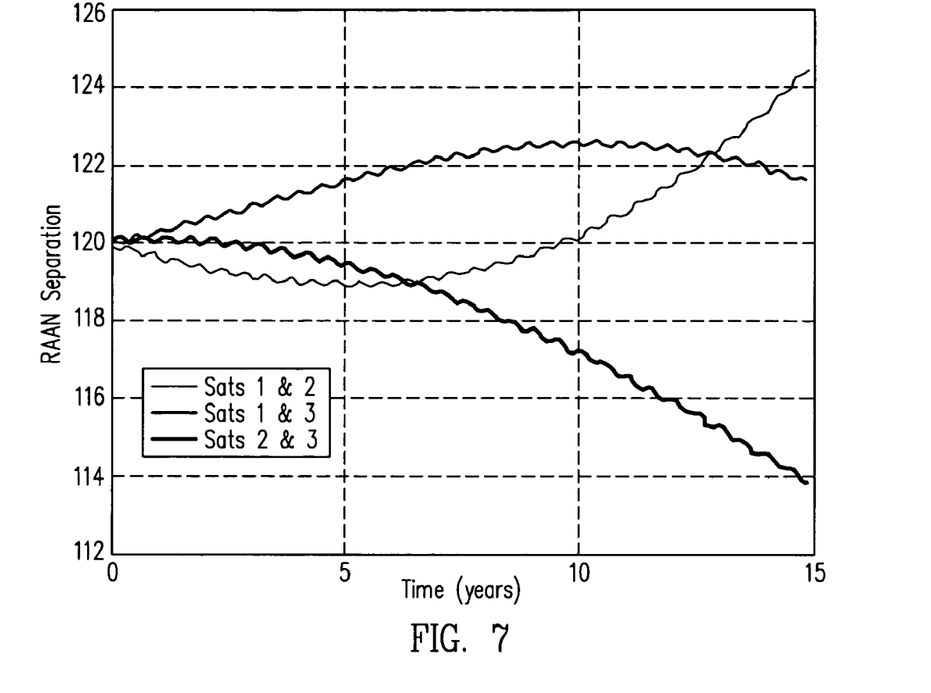
FIG. 7 is a graph illustrating the RAAN separation of an exemplary unoptimized three-satellite constellation over an assumed 15-year constellation life; and, FIG. 8 is a graph illustrating the RAAN separation of the three-satellite constellation of FIG. 7, but with the initial RAANs of the satellites having been optimized in accordance with the methods of the present invention.

As the number of satellites in the constellation increases, the process becomes slightly more complicated, but the method remains the same—one of the satellites is moved to minimize the maximum deviation from the nominal separation. FIG. 7 is a graph illustrating the RAAN separation of an exemplary three-satellite constellation over an assumed 15-year constellation life. With reference to FIG. 7, it should be noted that, for a three-satellite constellation, the conventional nominal RAAN separation is 120° (i.e., 360° divided by the number of satellites). The maximum and minimum excursions from the nominal RAAN separation can be calculated for each pair of adjacent satellites. In this case, the excursions are as follows:

maximum between satellites 1 & 2=4.46°, minimum between satellites 1 & 2=−1.16°;

maximum between satellites 2 & 3=0.17°, minimum between satellites 2 & 3=−6.11°;

maximum between satellites 1 & 3=2.71°, minimum between satellites 1 & 3=−0.01°.

The maximum and minimum excursions between the adjacent pairs are added together arithmetically, then the absolute value is taken. The satellite to be moved is the one that is common to the maximum and middle absolute sums. In the above example, the maximum and middle absolute sums are:

maximum absolute sum=5.94° is between satellites 2 & 3;

middle absolute sum=3.30° is between satellites 1 & 2;

minimum absolute sum=2.70° is between satellites 1 & 3.

It will be noted that, in this example, satellite 2 is common between the maximum and middle absolute sums, and therefore, moving the initial RAAN of this satellite will enable the maximum deviations in RAAN separation of the constellation to decrease. Half of the maximum absolute sum is then added to the initial RAAN of satellite 2 (in the correct direction), and the process is repeated until the minimum and maximum excursions are approximately equal. An algorithm (described with "pseudo-code," i.e., using the structural conventions of programming languages, but omitting detailed subroutines or language-specific syntax) of the above optimization method is described in more detail below.

Figure 8:
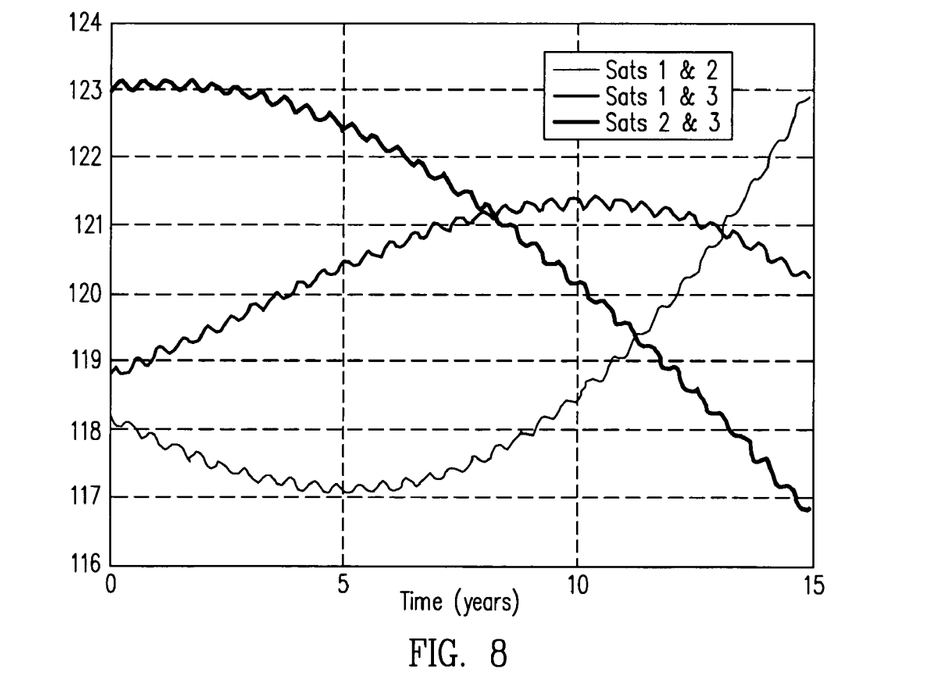

FIG. 8 is a graph illustrating the results of four iterations using the algorithmic method described above. The new excursions for the adjusted initial RAANs are then as follows:

maximum between satellites 1 & 2=2.92°, minimum between satellites 1 & 2=−2.97°;

maximum between satellites 2 & 3=3.15°, minimum between satellites 2 & 3=−3.20°;

maximum between satellites 1 & 3=1.44°, minimum between satellites 1 & 3=−1.19°.

It may be noted in the above that the maximum (and minimum) excursions from the nominal RAAN separation occur between satellites 2 & 3. Using the algorithm described above, only four iterations were necessary to decrease the excursions such that the maximum and minimum have approximately equal magnitudes; i.e., the maximum excursion over constellation life has been minimized.

Finally, for constellations having more than three satellites, one method for determining the approximate initial RAAN for each satellite is to break up the constellation into groups of three consecutive, or adjacent satellites and implementing the algorithm described above for each group. The process is repeated until convergence is reached on the maximum RAAN separation for the entire constellation. Here, convergence means that further iterations will not change the final result to within some specified tolerance.

As will be appreciated by those of skill in the art, the method described above is much simpler than evaluating every possible permutation of the initial RAAN for each satellite in the constellation. It should be understood that this entire process must be repeated with each permutation of initial inclination for each satellite. It is also important to note that different RAAN separations result in different coverage results, and this method only attempts to reduce the number of cases to be evaluated while finding reasonable values for the initial RAAN of each satellite.

---

Pseudocode Algorithm for Reducing the RAAN separation tradespace

```
For simplicity, assume a 3 satellite constellation
Let     x₁(t) be the time-varying RAAN of satellite 1
        x₂(t) be the time-varying RAAN of satellite 2
        x₃(t) be the time-varying RAAN of satellite 3
        n₁ be the initial RAAN of satellite 1 before any movements occur
        n₂ be the initial RAAN of satellite 2 before any movements occur
        n₃ be the initial RAAN of satellite 3 before any movements occur
for k = 0,1,2,3,...,t−1,t
Determine the RAAN separations (rs_ij) and find the excursions from the nominal
        rs₁₂(k) = (x₁(k)− n₁) −( x₂(k)− n₂)
        rs₂₃(k) = (x₂(k)− n₂) −( x₃(k)− n₃)
        rs₁₃(k) = (x₁(k)− n₁) −( x₃(k)− n₃)
end (for).
Calculate the absolute sum
        abs_sum_rs₁₂ = |max(rs₁₂) + min(rs₁₂)|
        abs_sum_rs₂₃ = |max(rs₂₃) + min(rs₂₃)|
        abs_sum_rs₁₃ = |max(rs₁₃) + min(rs₁₃)|
Find the common satellite to be moved
        max_check = max(abs_sum_rs₁₂, abs_sum_rs₂₃, abs_sum_rs₁₃)
        min_check = min(abs_sum_rs₁₂, abs_sum_rs₂₃, abs_sum_rs₁₃)
if ((max_check = abs_sum_rs₁₂) or (min_check = abs_sum_rs₂₃)) and
    ((max_check = abs_sum_rs₁₂) or (min_check = abs_sum_rs₂₃))
        mid_check = abs_sum_rs₁₃ !!Satellite 1 is common to both the max and mid
elseif ((max_check = abs_sum_rs₂₃) or (min_check = abs_sum_rs₁₃)) and
    ((max_check = abs_sum_rs₂₃) or (min_check = abs_sum_rs₁₃))
        mid_check = abs_sum_rs₁₂ !!Satellite 2 is common to both the max and mid
elseif ((max_check = abs_sum_rs₁₃) or (min_check = abs_sum_rs₁₂)) and
    ((max_check = abs_sum_rs₁₃) or (min_check = abs_sum_rs₁₂))
        mid_check = abs_sum_rs₂₃ !!Satellite 3 is common to both the max and mid
end (if).
Move the common satellite
if mid_check = abs_sum_rs₁₃
        x₁ = x₁ ± (mid_check/2) !! Add or subtract to move the sat in the correct direction
elseif mid_check = abs_sum_rs₁₂
        x₂ = x₂ ± (mid_check/2) !! Add or subtract to move the sat in the correct direction
elseif mid_check = abs_sum_rs₂₃
        x₃ = x₃ ± (mid_check/2) !! Add or subtract to move the sat in the correct direction
end (if).
```

---

The foregoing algorithm is repeated as many times as necessary to minimize the maximum deviations from the nominal RAAN separation to within some specified tolerance.

As will by now be appreciated by those of skill in the art, the methods of the invention simplify orbital operations and increase deliverable payload mass or spacecraft lifetime relative to the methods of the prior art. Many modifications, substitutions and variations can be made in and to the methods of the present invention without departing from its spirit and scope. In light of this, the scope of the present invention should not be limited to that of the particular exemplary embodiments illustrated and described herein, but instead, should be fully commensurate with that of the claims appended hereafter and their functional equivalents.

What is claimed is:

1. A method for establishing an initial inclination and right ascension of the ascending node (RAAN) of the orbits of each satellite of a constellation of Earth orbiting satellites in such a way that, over a specified operational life of the constellation, the associated inclination and RAAN values for each satellite can be allowed to drift in response to perturbative gravitational accelerations acting on the satellites while maintaining a required minimum line of sight elevation angle (MLOSEA) between a selected geographical area of the surface of the Earth and at least one satellite of the constellation and using a minimal amount of satellite propellant to effect out-of-plane control of the satellites, the method comprising:

provided an initial value of the inclination and RAAN of each of the orbits of each of the satellites adapted to effect maintenance of the required MLOSEA;

computing the resultant MLOSEA to the selected geographical area over the specified operational life of the constellation using the initial values of the inclinations and RAANs provided;

varying the provided initial values of the inclination and RAAN of the orbit of a first one of the satellites by selected amounts in such a way as to obtain a MLOSEA greater than the required MLOSEA;

re-computing the MLOSEA over the specified operational lifetime of the constellation using the varied initial inclination and RAAN values of the first satellite and the initial values provided of the inclination and RAAN of the other satellites;

reiterating the preceding steps until the MLOSEA to the selected geographical area either meets the required MLOSEA or cannot be further increased; and, repeating the preceding steps for each of the orbits of the other satellites of the constellation.

2. The method of claim 1, wherein the constellation comprises three or more satellites, and wherein providing an initial value of the inclination and right ascension of the ascending node (RAAN) of each of the satellites comprises:

assuming a nominal RAAN separation between each adjacent pair of the satellites;

dividing the constellation into groups of three adjacent satellites;

for each group of three adjacent satellites:
calculating the maximum and minimum excursions from the nominal RAAN separation of each adjacent pair of satellites during the life of the constellation;
adding the maximum and minimum excursions of each adjacent pair arithmetically;
taking the absolute value of the sum of each addition;
arranging the absolute values into a maximum, a middle and a minimum absolute sum;
selecting the satellite that is common to the maximum and the middle absolute sums;
adding half of the maximum absolute sum to the initial RAAN of the selected satellite arithmetically such that the maximum absolute sum of the group is decreased;
reiterating the preceding steps until the minimum and maximum excursions of the adjacent pairs of satellites of the group are equal to each other within a selected range of accuracy; and, repeating the preceding procedure for each group of three adjacent satellites of the constellation until the maximum RAAN separation for the entire constellation has been reduced to a value within a specified tolerance range.

3. A constellation of orbiting satellites, each having an initial inclination and a right ascension of the ascending node (RAAN) established in accordance with the method of claim 1.

4. The constellation of satellites of claim 3, wherein the satellites comprise communication, broadcast, navigation, mapping, or surveillance satellites.

5. A method for providing initial values of the respective inclinations and right ascensions of the ascending nodes (RAANs) of each of the satellites of a constellation of at least three Earth orbiting satellites that are within a selected range of values thereof adapted to minimize the amount of propellant required to maintain a required minimum line of sight elevation angle (MLOSEA) between a selected geographical area of the Earth and at least one satellite of the constellation, the method comprising:

assuming a nominal RAAN separation between each adjacent pair of the satellites;

dividing the constellation into groups of three adjacent satellites;

for each group of three adjacent satellites:
calculating the maximum and minimum excursions from the nominal RAAN separation of each adjacent pair of satellites during the life of the constellation;
adding the maximum and minimum excursions of each adjacent pair arithmetically;
taking the absolute value of the sum of each addition;
arranging the absolute values into a maximum, a middle and a minimum absolute sum;
selecting the satellite that is common to the maximum and the middle absolute sums;
adding half of the maximum absolute sum to the initial RAAN of the selected satellite arithmetically such that the maximum absolute sum of the group is decreased;
reiterating the preceding steps until the minimum and maximum excursions of the adjacent pairs of satellites of the group are equal to each other within a selected tolerance range; and, repeating the foregoing procedure for each group of three adjacent satellites of the constellation until the maximum RAAN separation for the entire constellation has been reduced to a value within a selected minimum range.

* * * * *

UNITED STATES PATENT AND TRADEMARK OFFICE
CERTIFICATE OF CORRECTION

| | |
|---|---|
| PATENT NO. | : 7,664,578 B2 |
| APPLICATION NO. | : 11/493244 |
| DATED | : February 16, 2010 |
| INVENTOR(S) | : Fowler et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 764 days.

Signed and Sealed this

Thirtieth Day of November, 2010

David J. Kappos
*Director of the United States Patent and Trademark Office*